US010924850B2

(12) United States Patent
Laaksonen et al.

(10) Patent No.: US 10,924,850 B2
(45) Date of Patent: *Feb. 16, 2021

(54) APPARATUS AND METHOD FOR AUDIO PROCESSING BASED ON DIRECTIONAL RANGES

(71) Applicant: Nokia Technologies Oy, Espoo (FI)

(72) Inventors: Lasse Juhani Laaksonen, Tampere (FI); Kemal Ugur, Tampere (FI); Pushkar Prasad Patwardhan, Maharashtra (IN); Adriana Vasilache, Tampere (FI); Jari Mathias Hagqvist, Kangasala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/369,081

(22) Filed: Mar. 29, 2019

(65) Prior Publication Data

US 2019/0222930 A1 Jul. 18, 2019

Related U.S. Application Data

(63) Continuation of application No. 15/657,658, filed on Jul. 24, 2017, which is a continuation of application (Continued)

(30) Foreign Application Priority Data

Dec. 21, 2011 (IN) .............................. 4496/CHE/2011

(51) Int. Cl.
*H04R 3/00* (2006.01)
*H04S 7/00* (2006.01)
(Continued)

(52) U.S. Cl.
CPC ................ *H04R 3/005* (2013.01); *H04S 7/30* (2013.01); *G10L 2021/02166* (2013.01);
(Continued)

(58) Field of Classification Search
CPC .......... H04R 3/005; H04R 1/40; H04R 1/406; H04R 1/20; H04R 1/222; H04R 1/26;
(Continued)

(56) References Cited

U.S. PATENT DOCUMENTS

2010/0245624 A1 9/2010 Beaucoup
2011/0129095 A1 6/2011 Avendano et al.
(Continued)

FOREIGN PATENT DOCUMENTS

EP 2388996 11/2011
JP 2006/222618 A 8/2006
(Continued)

*Primary Examiner* — Ahmad F. Matar
*Assistant Examiner* — Sabrina Diaz
(74) *Attorney, Agent, or Firm* — Harrington & Smith

(57) ABSTRACT

An apparatus configured to: determine a viewing angle associated with at least one apparatus camera; determine from at least two audio signals at least one audio source orientation relative to an apparatus; and generate at least one spatial filter including at least a first orientation range associated with the viewing angle and a second orientation range relative to the apparatus.

20 Claims, 10 Drawing Sheets

Related U.S. Application Data

No. 14/364,419, filed as application No. PCT/FI2012/051237 on Dec. 13, 2012, now Pat. No. 9,716,943.

(51) Int. Cl.
*H04N 13/246* (2018.01)
*G10L 21/0216* (2013.01)
*H04R 1/40* (2006.01)

(52) U.S. Cl.
CPC ............ *H04N 13/246* (2018.05); *H04R 1/406* (2013.01); *H04R 2430/25* (2013.01); *H04R 2460/07* (2013.01); *H04S 7/40* (2013.01); *H04S 2400/15* (2013.01); *H04S 2420/07* (2013.01)

(58) Field of Classification Search
CPC ........................... H04R 1/26532; H04R 1/326; H04R 2430/25; H04R 2430/21; H04R 2430/23; H04R 29/004; H04R 29/005; H04R 2499/13; H04S 7/30; H04S 7/40; H04S 2400/15; H04S 2420/07; G10L 2021/02166; H04W 13/0246; H03G 5/02

USPC .................................................... 381/92, 56

See application file for complete search history.

(56) References Cited

U.S. PATENT DOCUMENTS

| | | |
|---|---|---|
| 2011/0164141 A1 | 7/2011 | Tico et al. |
| 2012/0128174 A1 | 5/2012 | Tammi et al. |
| 2012/0163624 A1* | 6/2012 | Hyun .................... H04R 3/005 381/92 |
| 2012/0182429 A1 | 7/2012 | Forutanpour et al. |
| 2012/0327115 A1* | 12/2012 | Chhetri ................. H04R 3/005 345/633 |
| 2013/0044884 A1 | 2/2013 | Tammi et al. |

FOREIGN PATENT DOCUMENTS

| | | | |
|---|---|---|---|
| WO | 2010/014074 A1 | 2/2010 | |
| WO | 2011/076286 A1 | 6/2011 | |
| WO | WO-2011076286 A1 * | 6/2011 | ........... H04R 29/008 |

* cited by examiner

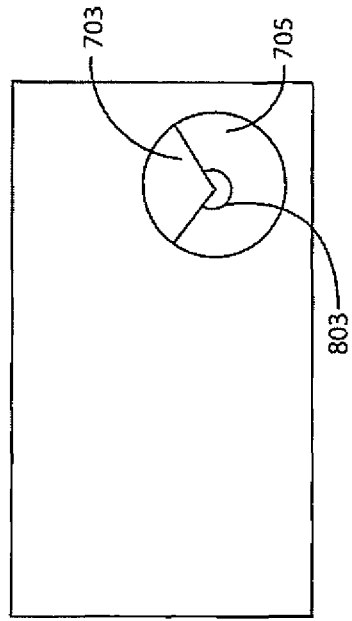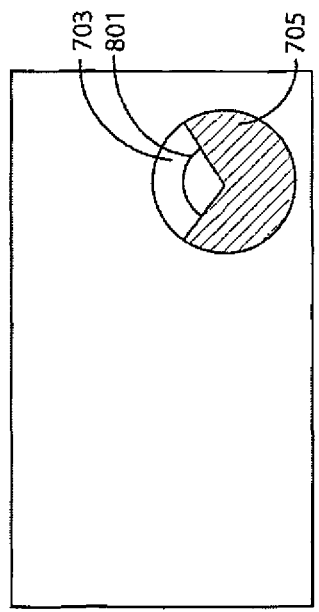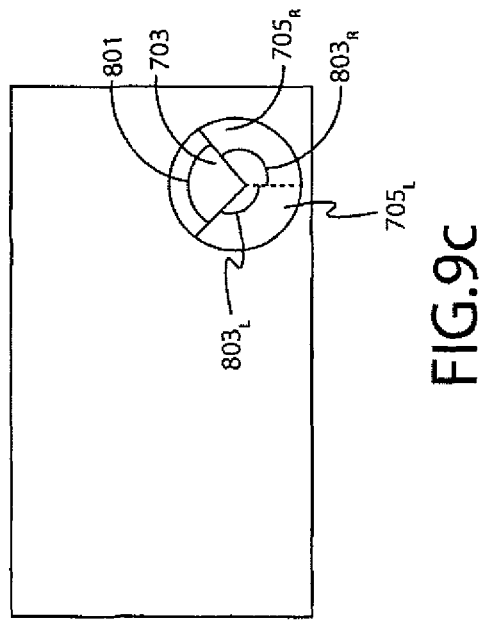

APPARATUS AND METHOD FOR AUDIO PROCESSING BASED ON DIRECTIONAL RANGES

CROSS REFERENCE TO RELATED APPLICATION

This is a continuation patent application of U.S. patent application Ser. No. 15/657,658 filed Jul. 24, 2017, which is a continuation application of U.S. patent application Ser. No. 14/364,419 filed on Jun. 11, 2014, which is a national stage application of PCT Application No. PCT/FI2012/051237 filed Dec. 13, 2012, which claims priority benefit to Indian Patent Application No. 4496/CHE/2011, filed Dec. 21, 2011, which are all hereby incorporated by reference in their entireties.

FIELD

The present application relates to apparatus for the processing of audio signals. The application further relates to, but is not limited to, portable or mobile apparatus for processing audio signals recorded from mobile devices.

BACKGROUND

Video recording on electronic apparatus is now common. Devices ranging from professional video capture equipment, consumer grade camcorders and digital cameras to mobile phones and even simple devices as webcams can be used for electronic acquisition of motion pictures, in other words recording video images. As recording video has become a standard feature on many mobile devices the technical quality of such equipment and the video they capture has rapidly improved. Recording personal experiences using a mobile device is quickly becoming an increasingly important use for mobile devices such as mobile phones and other user equipment. Combining this with the emergence of social media and news ways to efficiently share content underlies the importance of this field and the new opportunities it offers for the electronic device industry.

Recording from mobile devices however produces overall quality levels which are limited in comparison to professional created content. One key issue is the time the average consumer is able and willing to spend in processing or editing the recorded content, which in many cases is close to zero. This is particularly true with content which is shared with others quickly after capture in social network applications. An aspect of improving the technical quality of the recorded content can therefore be to assist the user to get the recording correct first time and minimising the need for editing the video or post processing the video.

Many devices now contain multi-microphone or spatial audio capture (SPAC) components where using at least three microphones on a device or connected to the device the acoustic signals surrounding the device are recorded. These spatial audio capture devices make it possible to detect the direction of audio signal components in other words provide a spatial domain to any frequency and time domain and furthermore enable the production of multichannel signals such as 5.1 channel audio signal on a mobile device.

The perception of the direction of video and audio signals differs. While the human visual system gathers information from a fairly large angle which is processed by the brain and quickly adapts to focussing on different parts of the area, it is not possible to see what is behind the viewer without turning the head. The human auditory system on the other hand is able to pick up clues of the whole environment or space within which it operates and the listener is able to hear sounds from behind the head. Electronic devices record video which is defined by the angle of view of the lens while audio recording typically includes all of the sounds around the recording apparatus defined by the microphone or microphone array coverage. In other words the video camera records everything that is-in-line-of-sight and in the visible spectrum as defined for the recording device. An object which appears between the lens of the camera and the intended subject can block the subject. However while a sound close to the microphone may mask sounds from further away the distance between the sound source and the microphone and the volume of the sound source are important as distant sounds can mask closer sounds depending on their loudness and timing. The effect of blocking or masking can thus be different for video and audio content.

Furthermore in recordings made by consumer devices the user can control the video part fairly easily for example to avoid an object blocking the subject by moving the camera and using a zoom lens. However such devices typically do not enable the user to have refined control over the capturing of acoustic signals and the generation of audio signals.

Although there are directional microphones (for example shotgun microphones) which can be used to improve the directional separation by damping environmental sounds, this is not necessarily a desired effect for a complete video sequence. On the other hand post-processing of the audio signal requires additional time and technical expertise which most consumers will lack in order to achieve better quality audio signal output

SUMMARY

Aspects of this application thus provide flexible audio signal focussing in recording acoustic signals.

According to a first aspect there is provided a method for audio signal adjustment comprising: determining a viewing angle associated with at least one apparatus camera; determining from at least two audio signals at least one audio source orientation relative to an apparatus; and generating at least one spatial filter including at least a first orientation range associated with the viewing angle and a second orientation range relative to the apparatus.

The method may comprise: generating an audio signal associated with the at least one audio source from the at least two audio signals; and spatially filtering the audio signal associated with the at least one audio source dependent on the at least one spatial filter.

The method may further comprise at least one of: outputting the spatially filtered audio signal; outputting the spatially filtered audio signal and the at least one spatial filter; and outputting the audio signal associated with the at least one audio source and the at least one spatial filter.

The audio signal associated with the at least one audio source comprises at least one of: a mono audio signal; a binaural audio signal; a stereo channel audio signal; and a multi-channel audio signal.

The method for audio signal adjustment may further comprise outputting the at least two audio signals and at least one spatial filter.

Determining a viewing angle associated with at least one apparatus camera may comprise at least one of: determining a horizontal field of view of the at least one camera; determining a vertical field of view of the at least one camera; determining a focal length of the at least one camera; determining a sensor size of the at least one camera;

determining an aspect ratio of the at least one camera; determining a digital zoom of the at least one camera; and determining a viewing angle from a user interface input.

Determining a viewing angle from a user interface input may comprise: displaying a representation of a viewing angle associated with at least one apparatus camera on a user interface; determining a user interface input indicating a spatial filtering region; and determining a user interface input indicating a spatial filtering region gain value.

Generating at least one spatial filter including at least a first orientation range associated with the viewing angle and a second orientation range relative to the apparatus may comprise: determining a pass spatial filter for the first orientation range within the viewing angle; and determining a stop spatial filter for the second orientation range outside the viewing angle.

Generating at least one spatial filter may comprise generating at least one spatial filter dependent on the at least one audio source orientation relative to an apparatus.

Generating the at least one spatial filter may comprise: determining a pass spatial filter for the first orientation range covering the at least one audio source orientation relative to an apparatus; and determining a stop spatial filter for the second orientation range not including the at least one audio source orientation relative to an apparatus An apparatus may be configured to perform the method as described herein.

A method may be substantially as herein described and illustrated in the accompanying drawings.

An apparatus may be substantially as herein described and illustrated in the accompanying drawings.

A computer program product may comprise program instructions to cause an apparatus to perform method as described herein.

The method may comprise generating at least two audio signals from at least two microphones.

The method may further comprise determining a motion parameter associated with the audio source.

Generating the at least one spatial filter may be dependent on the at least one audio source motion relative to the apparatus.

Generating the at least one spatial filter may comprise at least one of: determining at least one spatial filter first orientation range associated with the viewing angle gain; determining at least one spatial filter transition region; and determining at least one spatial filter second orientation range gain separate from the viewing angle gain.

The method may further comprise outputting the audio signal to at least one of: a pair of headphones; a headset; a multichannel speaker system; a memory; and a transmitter.

The method may further comprise: generating a visual representation of the at least one spatial filter; and outputting the visual representation of the at least one spatial filter to a display.

There is provided according to the application an apparatus comprising at least one processor and at least one memory including computer code for one or more programs, the at least one memory and the computer code configured to with the at least one processor cause the apparatus to at least perform: determining a viewing angle associated with at least one apparatus camera; determining from at least two audio signals at least one audio source orientation relative to an apparatus; and generating at least one spatial filter including at least a first orientation range associated with the viewing angle and a second orientation range relative to the apparatus.

The apparatus may be caused to perform: generating an audio signal associated with the at least one audio source from the at least two audio signals; and spatially filtering the audio signal associated with the at least one audio source dependent on the at least one spatial filter.

Generating at least one spatial filter may cause the apparatus to perform generating at least one spatial filter dependent on the at least one audio source orientation relative to an apparatus.

Generating the at least one spatial filter may cause the apparatus to perform: determining a pass spatial filter for the first orientation range covering the at least one audio source orientation relative to an apparatus; and determining a stop spatial filter for the second orientation range not including the at least one audio source orientation relative to an apparatus The apparatus may be caused to perform at least one of: outputting the spatially filtered audio signal; outputting the spatially filtered audio signal and the at least one spatial filter; and outputting the audio signal associated with the at least one audio source and the at least one spatial filter.

The audio signal associated with the at least one audio source may comprise at least one of: a mono audio signal; a binaural audio signal; a stereo channel audio signal; and a multi-channel audio signal.

The apparatus may further be caused to output the at least two audio signals and at least one spatial filter.

Determining a viewing angle associated with at least one apparatus camera may cause the apparatus to perform at least one of: determining a horizontal field of view of the at least one camera; determining a vertical field of view of the at least one camera; determining a focal length of the at least one camera; determining a sensor size of the at least one camera; determining an aspect ratio of the at least one camera; determining a digital zoom of the at least one camera; and determining a viewing angle from a user interface input.

Determining a viewing angle from a user interface input may cause the apparatus to perform: displaying a representation of a viewing angle associated with at least one apparatus camera on a user interface; determining a user interface input indicating a spatial filtering region; and determining a user interface input indicating a spatial filtering region gain value.

The apparatus may be caused to perform generating at least two audio signals from at least two microphones.

The apparatus may be caused to perform determining a motion parameter associated with the audio source.

Generating the at least one spatial filter may be dependent on the at least one audio source motion relative to the apparatus.

Generating the at least one spatial filter may cause the apparatus to perform at least one of: determining at least one spatial filter first orientation range associated with the viewing angle gain; determining at least one spatial filter transition region; and determining at least one spatial filter second orientation range gain separate from the viewing angle gain.

The apparatus may be caused to perform outputting the audio signal to at least one of: a pair of headphones; a headset; a multichannel speaker system; a memory; and a transmitter.

The apparatus may be caused to perform: generating a visual representation of the at least one spatial filter; and outputting the visual representation of the at least one spatial filter to a display.

Generating at least one spatial filter including at least a first orientation range associated with the viewing angle and a second orientation range relative to the apparatus may cause the apparatus to perform: determining a pass spatial filter for the first orientation range within the viewing angle; and determining a stop spatial filter for the second orientation range outside the viewing angle.

According to a third aspect of the application there is provided an apparatus comprising: a viewing determiner configured to determine a viewing angle associated with at least one apparatus camera; an spatial audio determiner configured to determine from at least two audio signals at least one audio source orientation relative to the apparatus; and a spatial filter generator configured to generate at least one spatial filter including at least a first orientation range associated with the viewing angle and a second orientation range relative to the apparatus.

The apparatus may comprise: a spatial audio signal generator configured to generate an audio signal associated with the at least one audio source from the at least two audio signals; and a spatial filter configured to spatially filter the audio signal associated with the at least one audio source dependent on the at least one spatial filter.

The apparatus may further comprise at least one of: a spatial filter output configured to output the spatially filtered audio signal; a combined spatial filter output configured to output the spatially filtered audio signal and the at least one spatial filter; and a directional audio output configured to output the audio signal associated with the at least one audio source and the at least one spatial filter.

The audio signal associated with the at least one audio source comprises at least one of: a mono audio signal; a binaural audio signal; a stereo channel audio signal; and a multi-channel audio signal.

The apparatus for audio signal adjustment may further comprise a combined microphone and filter output configured to output the at least two audio signals and at least one spatial filter.

The spatial filter generator may be configured to generate at least one spatial filter dependent on the at least one audio source orientation relative to an apparatus.

The spatial filter generator may be configured to: determine a pass spatial filter for the first orientation range covering the at least one audio source orientation relative to an apparatus; and determine a stop spatial filter for the second orientation range not including the at least one audio source orientation relative to an apparatus The viewing determiner may comprise at least one of: horizontal field of view determiner configured to determine a horizontal field of view of the at least one camera; vertical field of view determiner configured to determine a vertical field of view of the at least one camera; focal length determiner configured to determine a focal length of the at least one camera; sensor determiner configured to determine a sensor size of the at least one camera; aspect determiner configured to determine an aspect ratio of the at least one camera; zoom determiner configured to determine a digital zoom of the at least one camera; and user input determiner configured to determine a viewing angle from a user interface input.

The user interface input determiner may comprise: a display configured to display a representation of a viewing angle associated with at least one apparatus camera on a user interface; a viewing range user input configured to determine a user interface input indicating a spatial filtering region; and a gain user input configured to determine a user interface input indicating a spatial filtering region gain value.

The apparatus may comprise at least two microphones each configured to generate one of the at least two audio signals.

The apparatus may further comprise a motion determiner configured to determine a motion parameter associated with the audio source.

The spatial filter generator may be configured to generate the at least one spatial filter dependent on the at least one audio source motion relative to the apparatus.

The spatial filter generator may be configured to generate at least one of: determining at least one spatial filter first orientation range associated with the viewing angle gain; determining at least one spatial filter transition region; and determining at least one spatial filter second orientation range gain separate from the viewing angle gain.

The spatial filter generator may be configured to: determine a pass spatial filter for the first orientation range within the viewing angle; and determine a stop spatial filter for the second orientation range outside the viewing angle.

The apparatus may further comprise an audio output configured to output the audio signal to at least one of: a pair of headphones; a headset; a multichannel speaker system; a memory; and a transmitter.

The apparatus may further comprise: a display configured to generate a visual representation of the at least one spatial filter.

According to a fourth aspect of the application there is provided an apparatus comprising: means for determining a viewing angle associated with at least one apparatus camera; means for determining from at least two audio signals at least one audio source orientation relative to an apparatus; and means for generating at least one spatial filter including at least a first orientation range associated with the viewing angle and a second orientation range relative to the apparatus.

The apparatus may comprise: means for generating an audio signal associated with the at least one audio source from the at least two audio signals; and means for spatially filtering the audio signal associated with the at least one audio source dependent on the at least one spatial filter.

The apparatus may further comprise at least one of: means for outputting the spatially filtered audio signal; means for outputting the spatially filtered audio signal and the at least one spatial filter; and means for outputting the audio signal associated with the at least one audio source and the at least one spatial filter.

The audio signal associated with the at least one audio source comprises at least one of: a mono audio signal; a binaural audio signal; a stereo channel audio signal; and a multi-channel audio signal.

The apparatus may further comprise means for outputting the at least two audio signals and at least one spatial filter.

The means for generating the spatial filter may comprise means for generating at least one spatial filter dependent on the at least one audio source orientation relative to an apparatus.

The means for generating the spatial filter may comprise: means for determining a pass spatial filter for the first orientation range covering the at least one audio source orientation relative to an apparatus; and means for determining a stop spatial filter for the second orientation range not including the at least one audio source orientation relative to an apparatus.

The means for determining a viewing angle associated with at least one apparatus camera may comprise at least one of: means for determining a horizontal field of view of the at least one camera; means for determining a vertical field of view of the at least one camera; means for determining a focal length of the at least one camera; means for determining a sensor size of the at least one camera; means for determining an aspect ratio of the at least one camera; means for determining a digital zoom of the at least one camera; and means for determining a viewing angle from a user interface input.

The means for determining a viewing angle from a user interface input may comprise: means for displaying a representation of a viewing angle associated with at least one apparatus camera on a user interface; means for determining a user interface input indicating a spatial filtering region; and means for determining a user interface input indicating a spatial filtering region gain value.

The apparatus may comprise means for generating at least two audio signals from at least two microphones.

The apparatus may further comprise means for determining a motion parameter associated with the audio source.

The means for generating the at least one spatial filter may be dependent on the at least one audio source motion relative to the apparatus.

The means for generating the at least one spatial filter may comprise at least one of: means for determining at least one spatial filter first orientation range associated with the viewing angle gain; means for determining at least one spatial filter transition region; and means for determining at least one spatial filter second orientation gain separate from the viewing angle gain.

The means for generating the at least one spatial filter may comprise: means for determining a pass spatial filter for the first orientation range within the viewing angle; and means for determining a stop spatial filter for the second orientation range outside the viewing angle.

The apparatus may further comprise means for outputting the audio signal to at least one of: a pair of headphones; a headset; a multichannel speaker system; a memory; and a transmitter.

The apparatus may further comprise: means for generating a visual representation of the at least one spatial filter; and means for outputting the visual representation of the at least one spatial filter to a display.

An electronic device may comprise apparatus as described herein.

A chipset may comprise apparatus as described herein.

Embodiments of the present application aim to address problems associated with the state of the art.

SUMMARY OF THE FIGURES

For better understanding of the present application, reference will now be made by way of example to the accompanying drawings in which:

FIGS. 9a, 9b, and 9c show further polar audio lensing user interface display examples.

EMBODIMENTS OF THE APPLICATION

The following describes suitable apparatus and possible mechanisms for the provision of effective audio processing for producing an audio lensing or focussing effect controllable via the apparatus user interface. In the following examples the audio signals and audio capture is described as part of an audio and video capture apparatus.

The concept described herein relates to assisting audio recording or processing and associated audio presentation. Furthermore although the following examples are described with regards to the camera or video capture apparatus generating sensor data for permitting or enabling audio processing to occur it would be understood that in some embodiments other sensor data such as a compass data, gyroscope data, or accelerometer data can be used to produce suitable sensor values to assist in the generation of suitable processing parameters and audio profiles. Similarly in some embodiments sensor data from positional and/or orientation estimations such as estimated motion using satellite signals can similarly be used.

Figure 1:
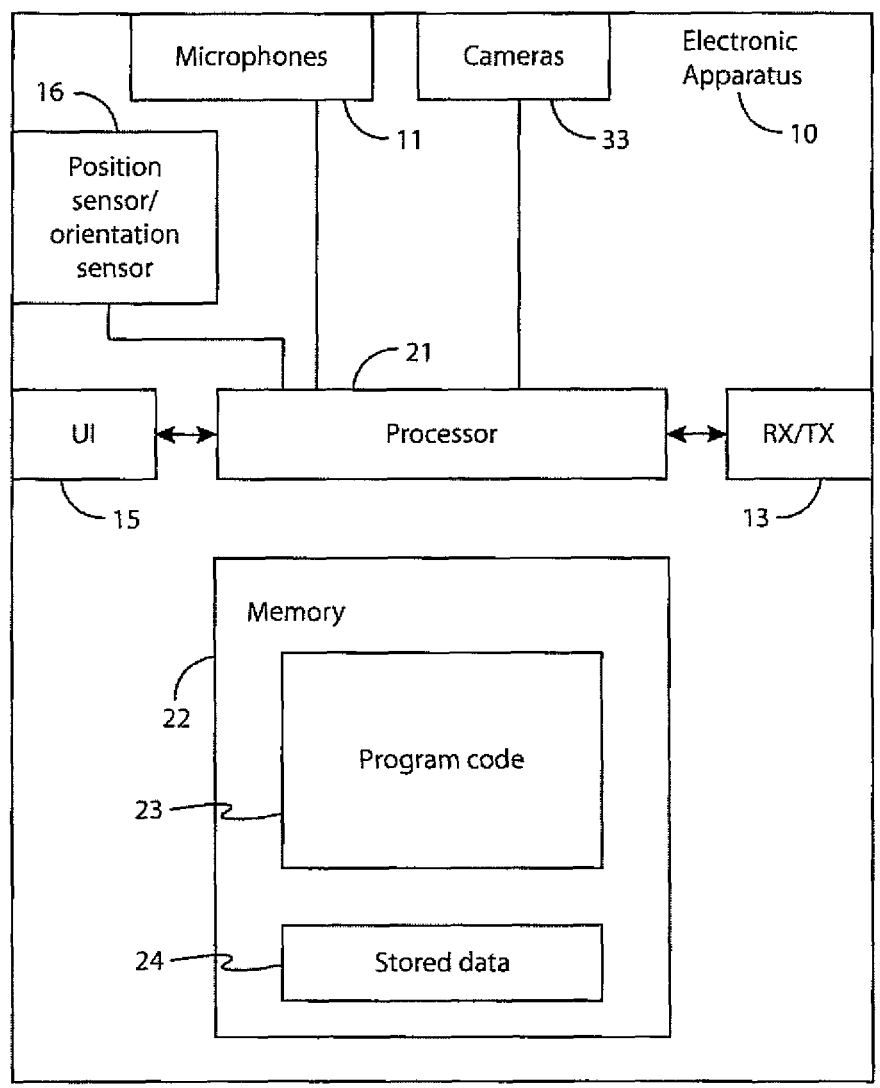
FIG. 1 shows schematically an apparatus or electronic device suitable for implementing some embodiments.

FIG. 1 shows a schematic block diagram of an exemplary apparatus or electronic device 10, which may be used to record or capture audio and/or audio video data.

The electronic device 10 may for example be a mobile terminal or user equipment of a wireless communication system. In some embodiments the apparatus can be an audio player or audio recorder, such as an MP3 player, a media recorder/player (also known as an MP4 player), or any suitable portable device suitable for recording audio or audio/video such as a camcorder or audio or video recorder.

The apparatus 10 can in some embodiments comprise an audio subsystem. The audio subsystem for example can comprise in some embodiments a microphone or array of microphones 11 for audio signal capture. In some embodiments the microphone or array of microphones can include solid state microphone(s), in other words microphones capable of capturing acoustic signals and outputting a suitable digital format audio signal. In some other embodiments the microphone or array of microphones 11 can comprise any suitable microphone or acoustic signal capture means, for example a condenser microphone, capacitor microphone, electrostatic microphone, Electret condenser microphone, dynamic microphone, ribbon microphone, carbon microphone, piezoelectric microphone, or micro-electrical-mechanical system (MEMS) microphone. The microphone 11 or array of microphones can in some embodiments output the audio captured signal to an analogue-to-digital converter (ADC).

In some embodiments the apparatus can further comprise an analogue-to-digital converter (ADC) configured to receive the analogue captured audio signal from the microphones and outputting the audio captured signal in a suitable digital form. The analogue-to-digital converter can be any suitable analogue-to-digital conversion or processing means.

In some embodiments the apparatus 10 audio subsystem further comprises a digital-to-analogue converter for converting digital audio signals from a processor 21 to a suitable analogue format. The digital-to-analogue converter (DAC) or signal processing means can in some embodiments be any suitable DAC technology.

Furthermore the audio subsystem can comprise in some embodiments a speaker. The speaker can in some embodiments receive the output from the digital-to-analogue converter and present the analogue audio signal to the user. In some embodiments the speaker can be representative of a headset, for example a set of headphones, or cordless headphones.

Although the apparatus 10 is described having both audio capture and audio presentation components, it would be understood that in some embodiments the apparatus 10 can comprise the audio or acoustic capture (or recording) parts of the audio subsystem only such that in some embodiments the microphones (for acoustic capture) and/or ADC are present only.

In some embodiments the apparatus 10 comprises a processor 21. The processor 21 is coupled to the audio subsystem and specifically in some examples the analogue-to-digital converter for receiving digital signals representing audio signals from the microphones 11. The processor 21 can be configured to execute various program codes. The implemented program codes can comprise for example audio focus or lensing routines.

In some embodiments the apparatus further comprises a memory 22. In some embodiments the processor is coupled to memory 22. The memory can be any suitable storage means. In some embodiments the memory 22 comprises a program code section 23 for storing program codes implementable upon the processor 21. Furthermore in some embodiments the memory 22 can further comprise a stored data section 24 for storing data, for example data that has been encoded in accordance with the application or data to be encoded via the application embodiments as described later. The implemented program code stored within the program code section 23, and the data stored within the stored data section 24 can be retrieved by the processor 21 whenever needed via the memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The transceiver 13 can communicate with further devices by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the apparatus comprises a position or orientation sensor configured to estimate the position of the apparatus 10. The position sensor can in some embodiments be a satellite positioning sensor such as a GPS (Global Positioning System), GLONASS or Galileo receiver.

In some embodiments the positioning sensor can be a cellular ID system or an assisted GPS system.

In some embodiments the apparatus 10 further comprises a direction or orientation sensor. The orientation/direction sensor can in some embodiments be an electronic compass, accelerometer, a gyroscope or be determined by the motion of the apparatus using the positioning estimate.

In some embodiments the apparatus comprises a visual imaging subsystem. The visual imaging subsystem can in some embodiments comprise at least one camera configured to capture image data. The at least one camera can comprise a suitable lensing or image focus element configured to focus an image on a suitable image sensor. In some embodiments the image sensor can be further configured to output digital image data to processor 21.

It is to be understood again that the structure of the electronic device 10 could be supplemented and varied in many ways.

Figure 2:
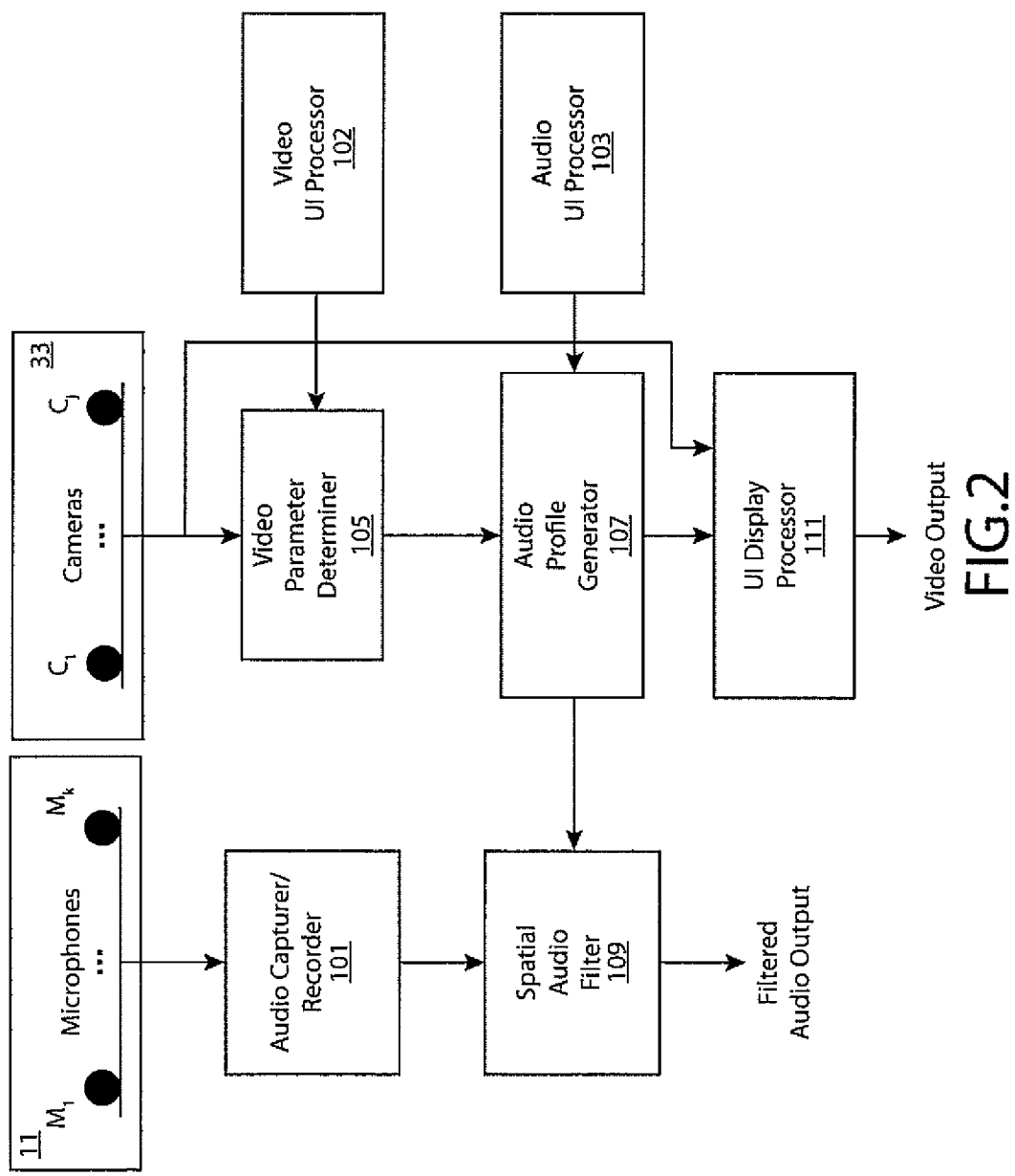
FIG. 2 shows schematically the spatial audio lensing apparatus according to some embodiments.

With respect to FIG. 2 a schematic view of an example electronic device or apparatus 10 suitable for implementing audio lensing according to some embodiments is shown. Furthermore with respect to FIG. 3 an overview operation of the apparatus shown in FIG. 2 is described.

The apparatus concept uses the angle of view information of the video recording and the directional audio cue information from multi-microphone audio signals to classify sounds into those that come from within the video scene and those that come from outside the video scene. From the video and audio information the amplification and/or muting of sound sources can be separately controlled. In such embodiments as described herein an audio focussing or lensing for video capture apparatus that is relatively easy to implement in mobile devices using standard components can be implemented.

In some embodiments as discussed herein the apparatus can comprise a microphone 11 arrangement which includes a microphone array. In the example shown in FIG. 2 the microphone array is shown including k microphones (microphone $M_1$ to microphone $M_k$). The microphones shown in FIG. 2 are configured to output the microphone audio data to an audio capturer or recorder 101.

Figure 3:
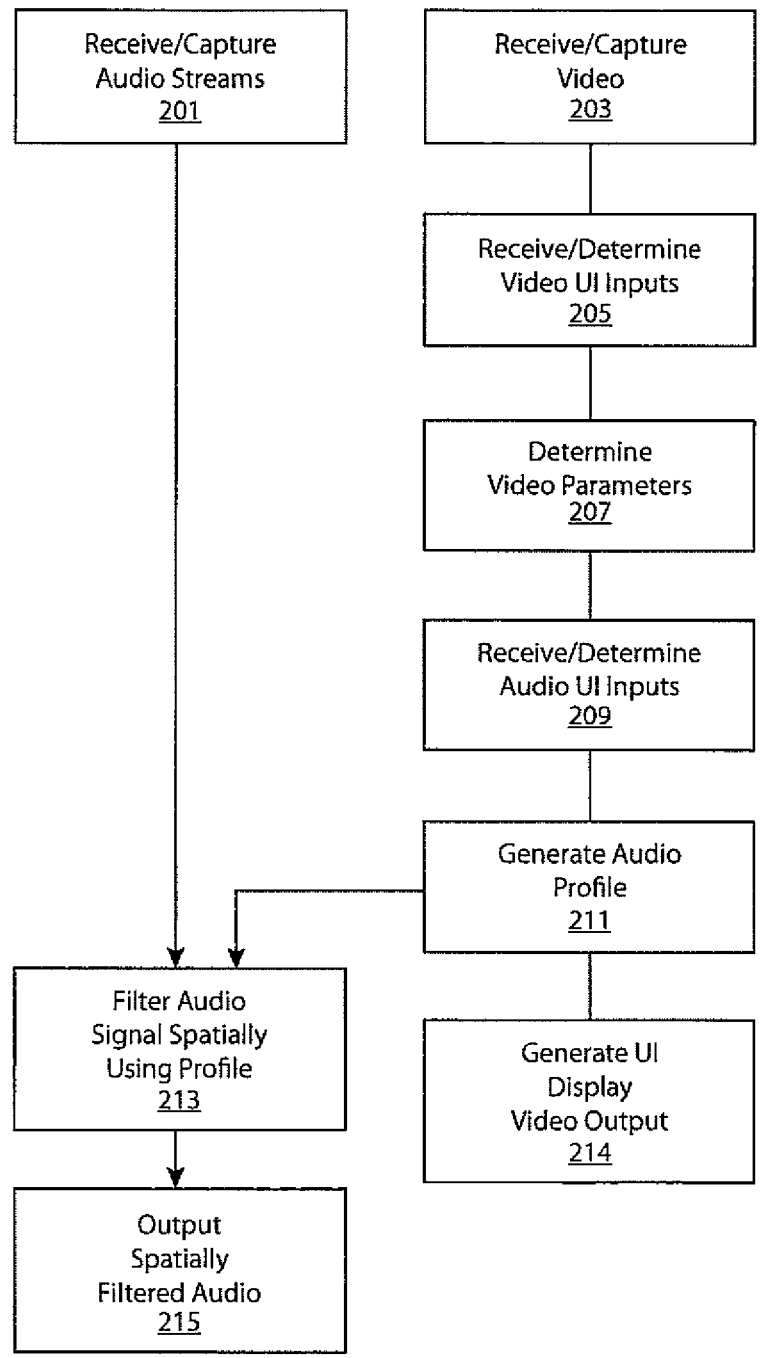
FIG. 3 shows a flow diagram of the operation of the audio lensing apparatus as shown in FIG. 2 according to some embodiments.

With respect to FIG. 3 the operation of capturing or generating the audio signal from microphones or receiving the audio signals from another apparatus/memory is shown in step 201.

In some embodiments the apparatus comprises an audio capturer/recorder 101. The audio capturer/recorder 101 can be configured in some embodiments to process the audio signals such as those received from the microphones to determine estimated source direction or orientation with respect to the apparatus. In some embodiments the audio capturer/recorder 101 comprises an analogue-to-digital converter (ADC) to convert the analogue output from the microphones into a suitable digital format for processing.

In some embodiments the audio capturer/recorder 101 can be configured to receive at least one digital audio signal from the audio subsystem arrangement. The audio capturer/recorder 101 can also be configured to perform any other suitable processing of the microphone data prior to the microphone data being passed to the spatial audio filter 109.

For example in some embodiments the audio capturer/recorder 101 can be configured to determine from the audio signal at least one audio source, and associated with the audio source estimate an audio source direction or location relative to the audio signals apparatus capturing the audio acoustic waves. Furthermore in some embodiments the audio capturer/recorder can be configured to generate an 'audio source' audio signal and a 'background' audio signal representing the audio components from the audio source and the remainder of the audio environment.

For example in some embodiments the audio capturer/recorder 101 can include a direction estimator configured to perform spatial audio capture, in other words determine audio sources and estimate directions of various audio sources determined from the generated microphone audio signals.

It is understood that given at least three microphones in a plane it is possible to estimate the direction of a single source using geometry. For example a microphone placement where the microphones are placed at vertices of an equilateral triangle permits a single audio source to be detected using the potential delays in receiving the audio source audio signal at the microphones located at the vertices of the triangle. In other words by determining the cross-correlation of recorded or captured audio signals at pairs of microphones it is possible to determine directions and therefore an approximate location of the audio sources.

Furthermore in some embodiments the audio capturer/recorder 101 is configured to determine multiple audio sources by performing directional analysis for various audio frequency bands and associating an audio source with the signals received in each band.

In some embodiments the directional analysis can be carried out in the time domain as well as the frequency domain as discussed herein.

In some embodiments the audio capturer/recorder is configured to include a signal framer. The signal framer is configured to group the digital audio samples for each microphone or channel input into determiner length groups. In some embodiments each of these groups or frames can overlap with the preceding and succeeding groups or frames. For example in some embodiments each frame is 20 milliseconds long and overlaps by 10 milliseconds with the preceding frame as also 10 milliseconds with the succeeding frame. In some embodiments the framer furthermore can be configured to perform a mathematical windowing function on each of the frames.

In some embodiments each of the frames are passed to a time to frequency domain transformer. The time to frequency domain transformer can be any suitable transformer such as a fast Fourier transformer (FFT), a discrete cosine transformer (DCT), a modified discrete cosine transformer (MDCT), or quadrature mirror filter (QMF).

The output of the time to frequency domain transformer can then be passed to a sub-band filter.

In some embodiments the audio capture/recorder 101 can comprise a sub-band filter configured to filter the frequency domain representations of the audio signals into defined sub-bands. The sub-bands can be determined according to any suitable division, such as overlapping, non-overlapping, or psycho-acoustic principles. The output of the sub-band filtering, the sub-band filter frequency domain audio representation can be passed to a cross correlator. In some embodiments the cross correlator is configured to receive pairs of channels sub-bands and determine for each of the sub-bands a delay value which maximises the cross correlation product. In some embodiments where only a single audio source is to be detected and analysed the dominant delay across each sub-band for a pair of channels is selected.

In some embodiments the time delay can be used then to generate a sum or average signal (or mid signal) defining frequency domain representation of the audio source audio signal (for example by combining a first channel input with a time delayed second channel input and finding the average of the two) furthermore by removing or subtracting the determined audio source signal from the recorded audio signals a background audio signal.

It would be understood that in some embodiments by adding additional sources or channels or comparing pairs of microphone audio signals (or other pairs of channels) a more precise two dimensional or three dimensional positional estimate of the audio source can be determined.

The operation of receiving or capturing the audio streams is shown in FIG. 3 by step 201.

The apparatus furthermore can comprise at least one camera 33. The at least one camera is shown in this example in FIG. 2 by the array of cameras $C_1$ to $C_J$. The camera output can be passed in some embodiments to a video parameter determiner 105. Furthermore in some embodiments the camera output can be passed to a user interface display processor 111.

The operation of receiving or capturing video data is shown in FIG. 3 by step 203.

In some embodiments the apparatus comprises a video user interface processor 102. The video user interface processor 102 can be configured to output user interface inputs to a video parameter determiner 105. For example the video user interface processor 102 can be configured to receive information from the user interface indicating where the apparatus is focussing on a particular region, for example by optical or digital video zoom operations. In some embodiments a user of the apparatus can focus on a part of the captured image where the captured image is displayed on the apparatus display and the user indicates or selects a portion or part of the image which is the direction of audio focussing.

The operation of receiving or determining the video user interface inputs is shown in FIG. 3 by step 205.

In some embodiments the apparatus comprises a video parameter determiner 105. The video parameter determiner 105 is configured to receive the information from the cameras and furthermore from the video user interface processor 102 and determine from these inputs suitable video parameters. Suitable video parameters for example can be the angle of view (in terms of horizontal and vertical dimensions) of the video being recorded based on the focal length of the lens, the sensor size and the aspect ratio.

Furthermore the angle of view can in some embodiments be derived based on the video user interface processor inputs such as a digital zoom operation of the image captured by the camera. Therefore in some embodiments the video parameter determiner 105 can be configured to determine or estimate the angle of view using the focal length of the lens, sensor size, aspect ratio and digital zoom parameters. Furthermore in some embodiments the determination of the angle of view can be determined by a suitable determination or estimation algorithm which allows the focal length to change as a function of the focussing distance.

The video parameter determiner 105 can be configured to output the video parameter values of the angle of view information to an audio profile generator 107.

The operation of determining video parameters can be shown in FIG. 3 by step 207.

In some embodiments the apparatus comprises an audio user interface processor 103. The audio user interface processor 103 can be configured to determine or supply audio filtering information to the audio profile generator 107. For example in some embodiments audio user interface processor 103 can be configured to determine or provide to the audio profile generator 107 spatial filtering characteristics such as the frequency of roll-off or degree of damping to be applied to audio signals outside of the selected region such as the angle of view.

The operation of receiving or determining audio user interface inputs is shown in FIG. 3 by step 209.

The audio profile generator 107 in some embodiments is configured to receive information from the video parameter determiner 105 for example the angle of view of the camera and furthermore receive any audio user interface processor inputs to determine a spatial audio profile based on the video and UI audio information available. The audio profile generator 107 can output the generated audio profile to a spatial audio filter in order to control the spatial audio filter. The audio profile generator 107 can furthermore in some embodiments be configured to output to a user interface display processor 111 the determined audio profile.

The operation of generating a spatial audio profile is shown in FIG. 3 by step 211.

In some embodiments the apparatus comprises a spatial audio filter 109. The spatial audio filter is configured to receive the audio data from the audio capturer/recorder 101, for example the audio source information and furthermore receive from the audio profile generator a specific audio profile regards to the spatial area. The spatial audio filter is therefore configured to apply the audio profile to the audio signals from the audio capturer/recorder 101. The output of the spatial audio filter is a spatially filtered audio output.

For example in some embodiments the spatial audio filter is configured to determine the filter value associated with the direction or location of each audio source and then multiply the filter value with the audio signal associated with each audio source.

The operation of filtering the audio signals spatially using the profile is shown in FIG. 3 by step 213.

Furthermore the operation of outputting the spatially filtered audio is shown in FIG. 3 by step 215.

In some embodiments the apparatus is configured to output the spatially filtered audio signals such as the modified stereo signals and with the audio signals include (side) information such as the stereo signal directional components and the determined spatial filtering profile. In such embodiments the apparatus can be configured to output the spatially filtered audio signal and the (side) further information which can be received by a further apparatus, such as an audio server configured to collate recorded audio and video signals for later transmission or directly to a listening apparatus. These embodiments permit similar control of the audio signal at playback.

In some embodiments the apparatus is configured to output the originally generated audio signals with the information determined from the audio profile generator. In some embodiments the audio signals can be processed so to downmix the original multi-channel microphone signals to a stereo/mono audio signal or in some embodiments upmix the original microphone multi-channel (for example a 3-mic) audio signals to a multi-channel (for example 5.1 channel) audio signal before being output or transmitted with the audio profile information. In some such embodiments no spatial filter is included in the apparatus.

In some embodiments the audio downmix/upmix operations can be performed as a separate step or as part of the spatial filtering (which in some embodiments can be defined by controlling the gain control). In some embodiments however these operation can be performed in the same algorithm/processing element.

In some embodiments the apparatus comprises a user interface display processor 111 configured to receive the camera and audio profile generator outputs to generate a video output for the device to display to the user showing the camera view and also the audio profile applied to the spatial audio filter for spatially audio filtering the audio signals from the microphones.

Figure 4:
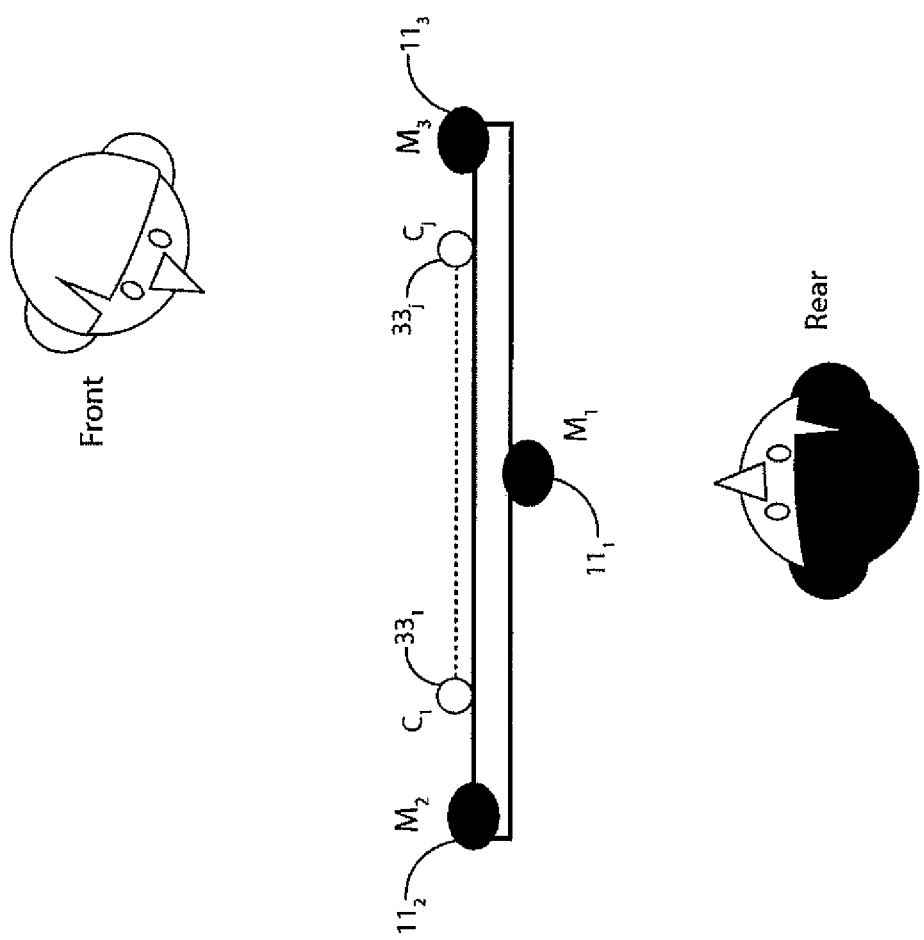
FIG. 4 shows schematically a physical audio lensing arrangement apparatus according to some embodiments.

With respect to FIG. 4 an example configuration of microphones and cameras on an apparatus is shown. For example the apparatus 10 can comprise the cameras $C_1$ $33_1$ to $C_J$ $33_J$ aligned on the front of the apparatus pointing forwards, with a first microphone $M_1$ $11_1$ located on the rear of the apparatus pointing rearwards, a second microphone $M_2$ $11_2$ located on the front left of the apparatus pointing forwards and a third microphone $M_3$ $11_3$ located on the front right of the apparatus pointing forwards also.

Figure 5:
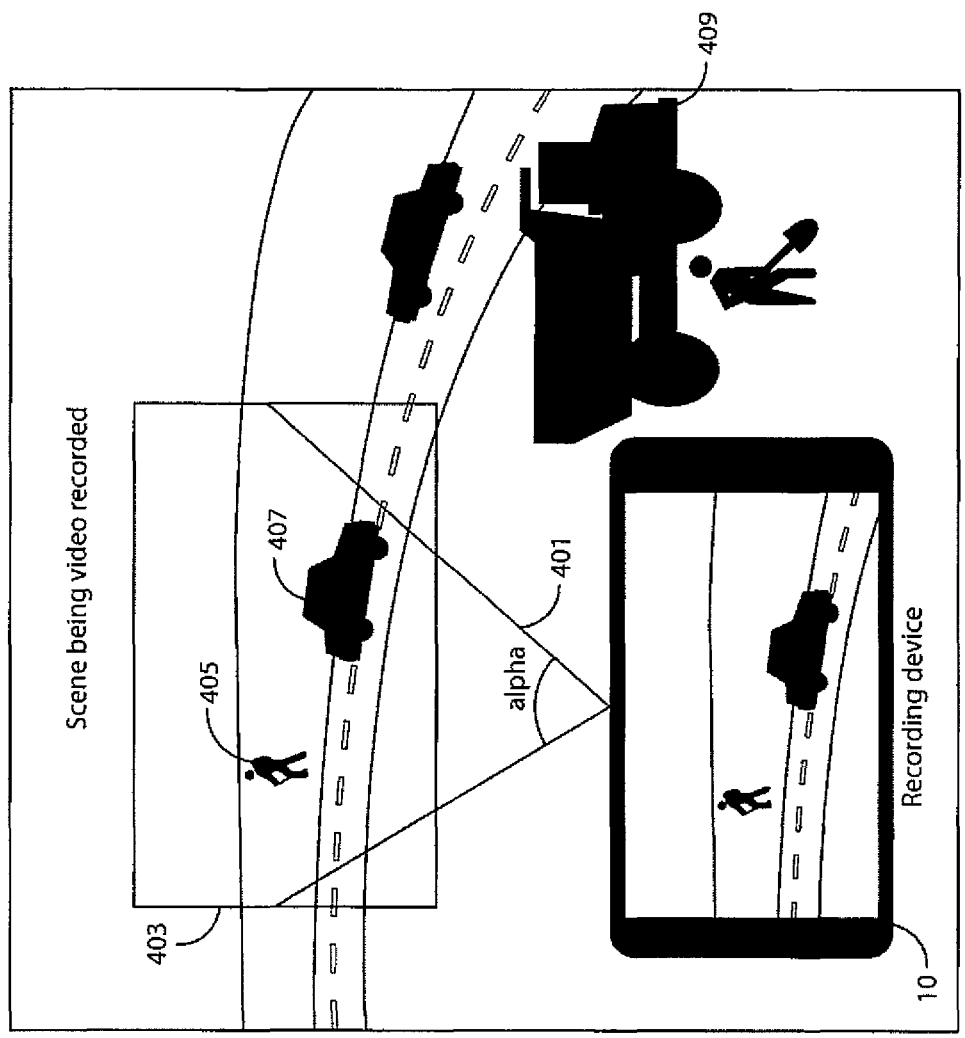
FIG. 5 shows an example audio lensing operation according to some embodiments.

With respect to FIG. 5 an example use of apparatus according to some embodiments is shown. In such an example the apparatus 10 is shown performing video recording and with sound sources within and outside of the video scene angle of view. The apparatus 10 is shown with a video recording angle α 401 or angle of view showing a scene being video recorded 403. Similarly the example figure shows the sound sources being recorded such as a walker 405 and a car 407 which are located within the video recorded angle of view and audio signals associated with the sources kept or amplified whereas the sound sources such as workmen, lorries and other cars 409 are outside of the angle of view and therefore to be muted by the spatial audio filter profile.

Figure 6:
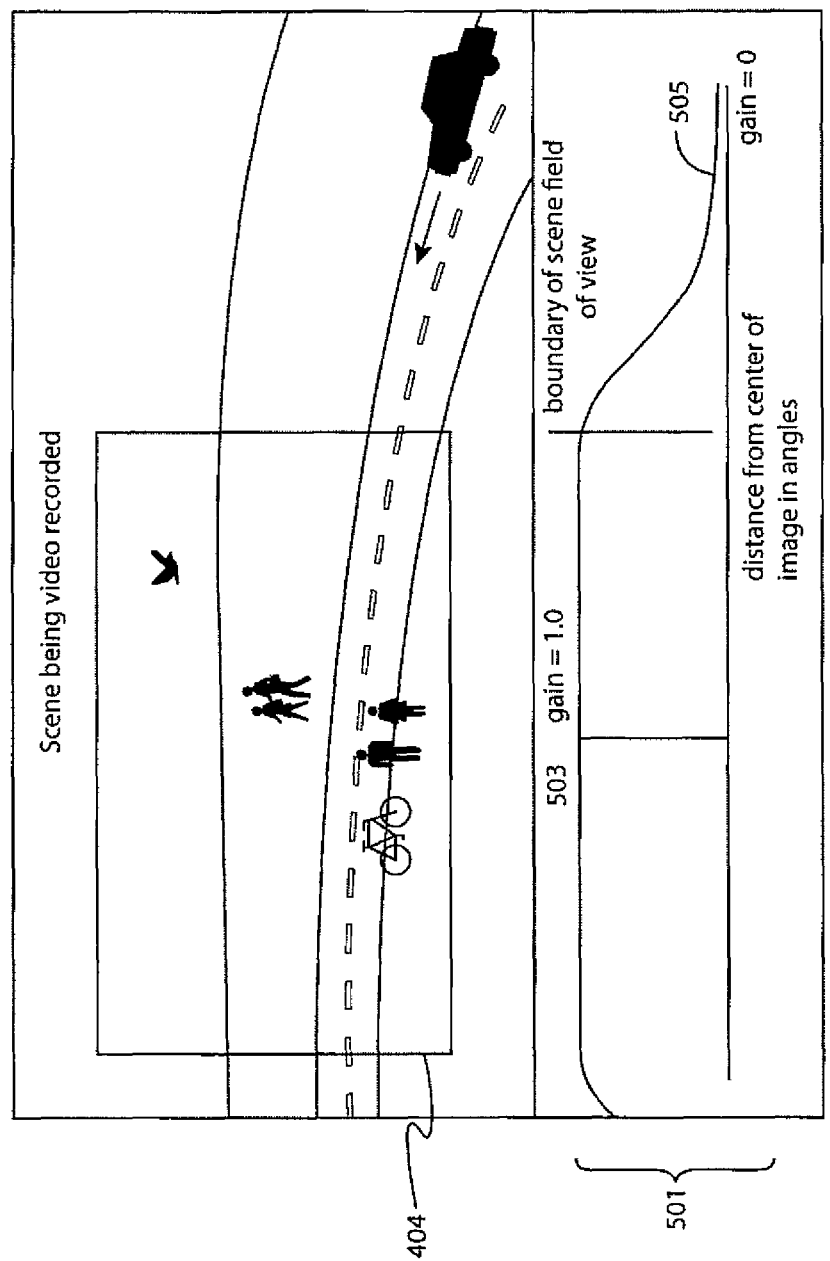
FIG. 6 shows an example audio lensing spatial filter profile according to some embodiments.

The FIG. 6 shows for example an example spatial audio filter profile 501 with respect to the video angle of view. The audio profile of the spatial audio filter 501 in some embodiments has a unitary gain portion 303 within the boundary of the scene field of view 404 and a roll off filtering portion 505 outside of the field of view region. It would be understood thus as an audio source approaches the angle of view region the degree of roll-off a flexible control for steady increases of audio signal as the audio source comes into view (such as shown by car 507).

With respect to FIGS. 7a to 7d a series of example spatial audio filter profiles are shown. For example in FIG. 7a a uniform profile is shown. The uniform profile 601 is one which does not discriminate between audio sources outside and inside the video scene boundary, in other words there is no damping of directional sound.

Figure 7A:
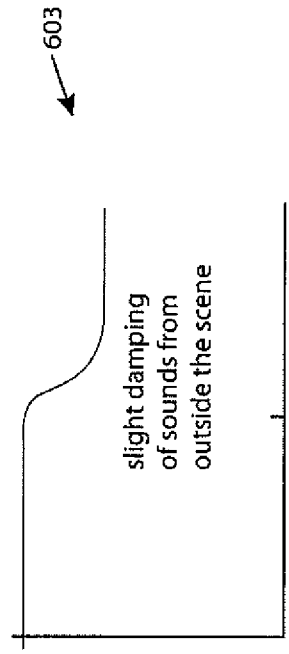
FIGS. 7a to 7d show example audio lensing spatial filter profiles according to some embodiments.
Figure 7B:
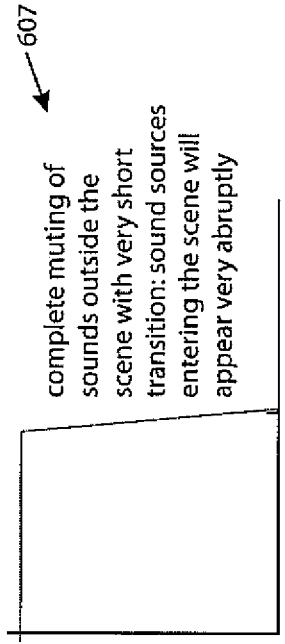

With respect to FIG. 7b a spatial audio filter profile where a partial damping of sounds from outside the visible angle of view scene is shown by the profile 603.

Figure 7C:
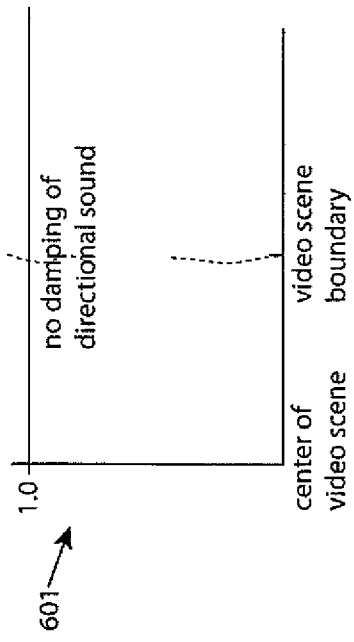

With respect to FIG. 7c a spatial audio filter profile where a complete muting of sounds outside the video scene boundary a slow transition or slow roll off profile permits sounds which cross the boundary to be filtered in such a manner that they do not suddenly disappear or appear as experienced by the listener of the generated audio signals.

Figure 7D:
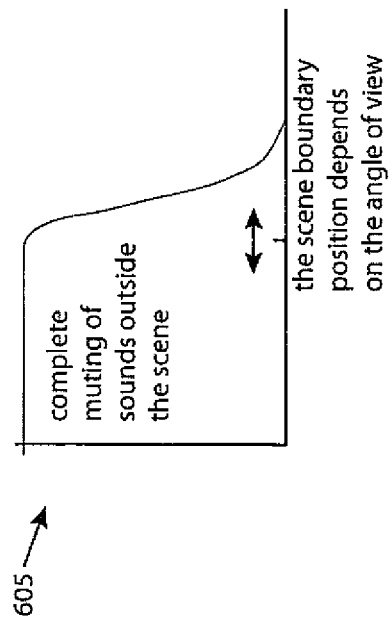

The spatial audio filter profile 607 shown in FIG. 7d shows a further complete muting of sound outside of the scene but with a very short or no transition region. The sound sources entering the scene will thus in some embodiments appear very abruptly or suddenly. In some embodiments for example where the user wishes to record video in a theatre play a profile can be configured such that the apparatus can be positioned in such a way that the video is zoomed in so that the stage covers the whole angle of view and that the user wishes to record the performance including the lines spoken by the actors but without any distractive noises of the audience such a child's crying or audience coughing. In such embodiments the user by using a spatial audio filter as shown in FIG. 7d can focus the audio recording on the sound sources within the angle of view of the video scene and the user experience watching the recording is greatly enhanced.

In some embodiments the user of the apparatus can select a first profile which provides an audio focus outside of the viewing angle. For example a profile can be selected or determined from an audio UI processor input to record atmosphere in the audience, such as at a football match. Thus the user can turn the camera to the audience to indicate an audio focus point or region and then once an audio focus is defined move the apparatus towards the pitch at times zooming in for more detail and zooming out to show a more general view of the stadium while maintaining the audio focus in the first direction rather than following the apparatus angle of view. The directional audio focus can be maintained in some embodiments by the apparatus audio source location determining a 'static' audio source, in other words any audio source motion is because of the apparatus moving or in some embodiments positional and/or rotational sensor inputs enabling the rotation/motion of the apparatus to be determined independent of the audio source direction determination.

In such examples the apparatus can in some embodiments record all of the ambient sounds to capture the experience of a live football match by applying a uniform profile such as shown in 7a.

In some examples the user may wish to audio defocus or mute a region by use of a suitable spatial audio filter profile. For example to 'mute' the audio signals from a group of fans singing abusive songs. In some other embodiments the apparatus can apply a spatial audio filter which can be configured to enhance the audio signals from at least one first region, to maintain the audio signals from at least one second region and to mute or partially mute the audio signals from at least one third region. For example the apparatus can first be directed at a group of fans singing in support of the team, and starting a muting focus operation directed at a second region to mute distracting shouts from other spectators or the voices of people next to them. By zooming into the group of fans singing and controlling the amplification or filtering at the same time filtering out the distracting noises and voices around them the user can improve the recording experience.

In some embodiments the spatial audio filtering can be configured to mute audio signals within the angle of view for example where the user is focussing on a noisy device but wishing to record the audio surrounding the device. For example when a user of the apparatus is inspecting a machine with a sales person explaining the functionality of the machine where the machine can generate a high level of noise that makes explanation more difficult to hear and understand. In such examples the operator can video the machine running and dampen or mute the sound within the video scene while passing or not filtering the sounds in the ambient area where the sales person is talking.

In some embodiments the processing of the audio and video streams is carried out separately from the capture of the audio and video streams. Thus for example the capture of the audio and video can be carried out at a first time and the processing at a later time. In some embodiments the capture of the audio and video streams is carried out at a first apparatus which can be broadcast or transmitted to a second or further apparatus where the processing according to some embodiments can be carried out. For example a first apparatus can record video and audio within a zoo of exotic animals. The apparatus can generate audio and video signals permitting the user of the apparatus to dampen the sounds outside the angle of view (for example to suppress voices of strangers talking around them and concentrate on the noise made by the animals). However at a later time the user can replay the video (for example on another apparatus) and filter the audio to hear the ambient sounds rather than the noises made by the animals. In other words the audio track can be spatially filtered during a later playback using a separate audio profile to the one originally used during the 'real time' playback.

As discussed herein an abrupt on-off cut-off at the boundary of the video scene is not necessarily a desirable effect perceptually and in some embodiments a defined spatial audio filter can be implemented with a roll-off or transient or transitional boundary between the cut off and non-cut off regions which permits a more gradual audio filtering. In some embodiments the spatial audio filter profile can be motion as well as positional or directional in nature. For example in some embodiments the spatial audio filter profile generator is dependent on the relative motion of the sound source to the apparatus as well as the direction relative to the apparatus. Thus in some embodiments by detecting and tracking individual sound sources each sound source can experience a different filter profile.

For example in some embodiments a sound source such as a car moving quickly towards the scene boundary can be weakly filtered i.e. substantially maintained when compared against a static or slow sound source which moves towards the scene very slowly for example a parked car with its motor running, which is muted completely or substantially.

In some embodiments there therefore may be more than one damping profile operational at any time.

Although we have described a three microphone capture apparatus operating in a single plane, typically horizontal it would be understood that, a fourth microphone can provide vertical plane or elevation sound source direction estimation. In such embodiments, the spatial audio filter profile can represent both horizontal and vertical spatial components. In some embodiments the capture apparatus is configured to transmit or store a bitstream with directional audio and video signals and further information to define the visual angle of view of the cameras. In such embodiments it can be possible to implement a playback enhancement feature to improve the user experience. In some embodiments where a bitstream of directional audio components is available but no visual angle of view of the video signal is provided, crude approximations of the angle of view can be utilized to implement the said playback enhancement feature.

Figure 8:
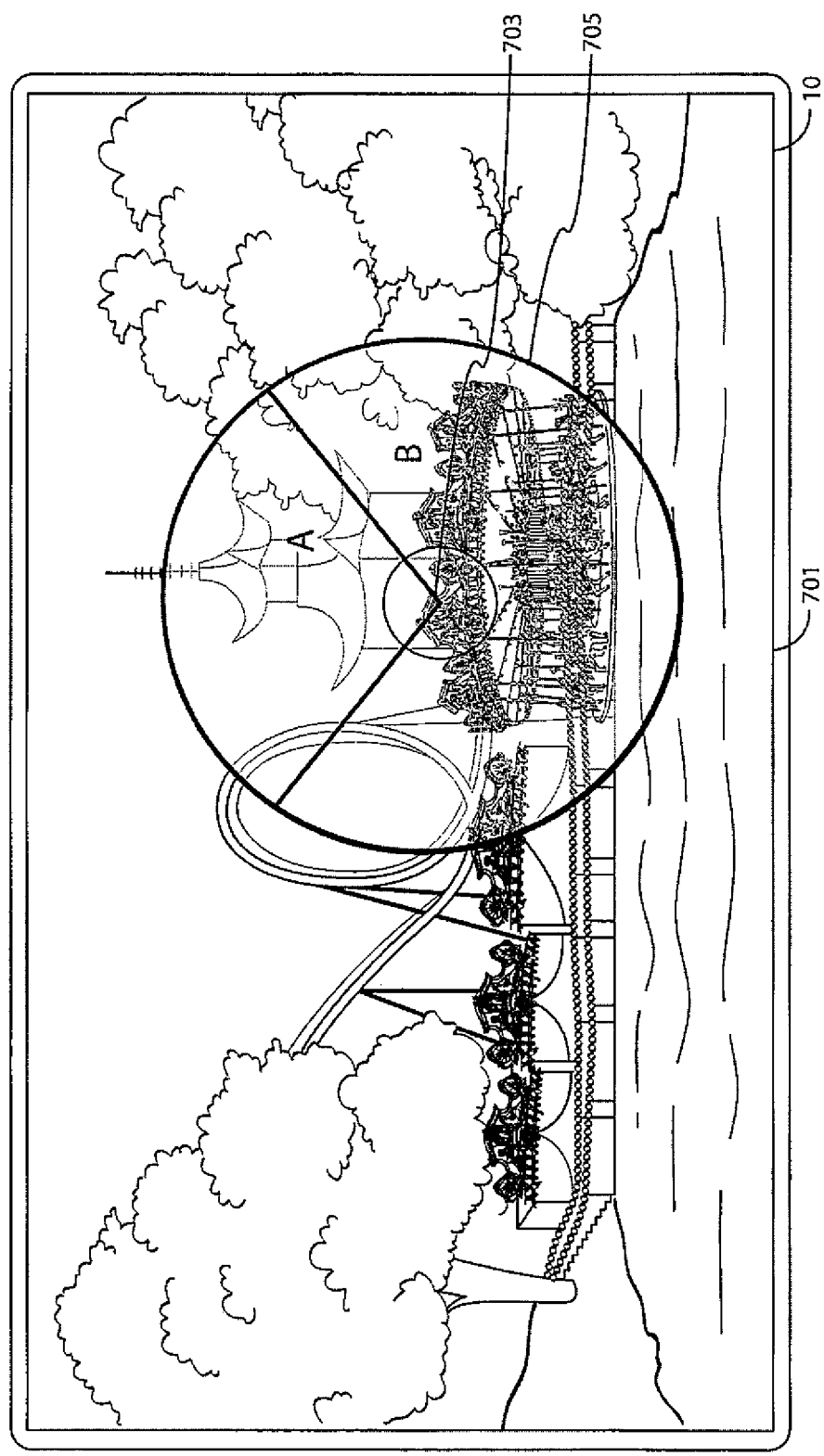
FIG. 8 shows an example audio lensing user interface display according to some embodiments.

With respect to FIG. 8 an example user interface display output is shown showing the video capture or camera image 701 on the display of the apparatus 10 with an opaque visual angle of view indicator shown by the pie chart showing the visual angle of view region A 703 with respect to a 360° angle B 705.

With respect to FIGS. 9a, 9b and 9c further example user interface display representations are shown. With respect to FIG. 9a an example audio focus or lensing visual representation of the spatial audio filter profile is shown wherein the visual angle of view region 703 and the complete 360° region 705 are shown on the display, and where a gain profile value 801 for the gain within the angle of view is displayed. In some embodiments where the display is a touch screen the spatial audio filter pass region angle of view width used for example to control the transition or roll-off regions as described in FIGS. 7a to 7d could be adjusted by pinching or expanding the arms of the angle of view. In some embodiments the profile gain value changed by moving a finger across the display from the centre of the pie chart towards the pie chart circumference to increase the gain and the opposite way to decrease the gain within the angle of view region.

With respect to FIG. 9b an example is shown wherein the audio profile for the remaining region is shown by the remaining 360° region gain profile 803. In some embodiments it would be understood that the profile filter implements an automatic transitional region between the angle of view value and the remaining 360° region spatial audio filter gain values.

With respect to FIG. 9c an example user interface is shown where there can be more than one region outside of the angle of view which can have different spatial audio filter gain profile distributions. For example as shown in FIG. 9c the remainder 360° region 705 is divided into a left remainder $705_L$ and a right remainder $705_R$ region with a left remainder gain value $803_L$ and a right remainder gain value $803_R$.

Figure 10B:
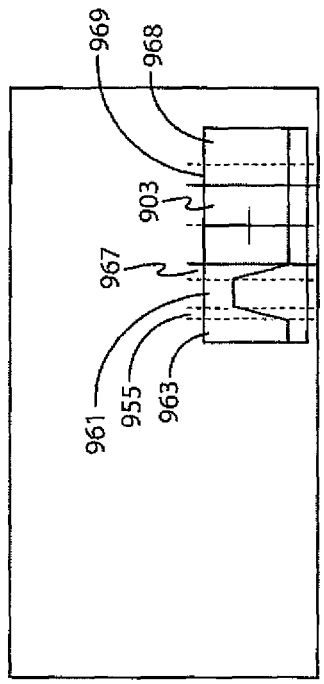
FIGS. 10a and 10b show cartesian audio lensing user interface display examples according to some embodiments.
Figure 10A:
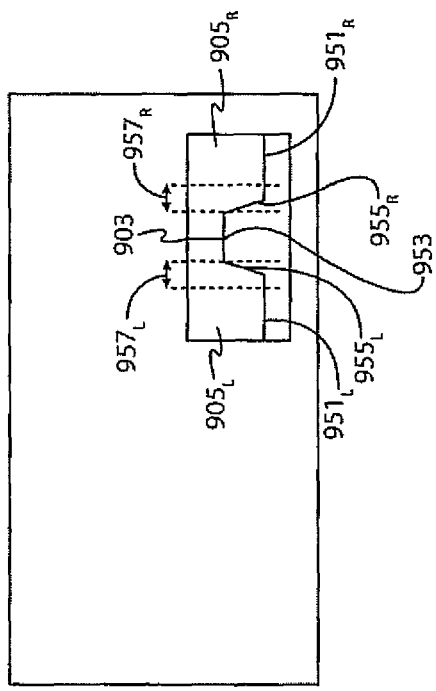

With respect to FIGS. 10a and 10b a user interface can implement a linear or cartesian display model whereby the 360 degrees surrounding the apparatus are represented by a cartesian graphical arrangement with the angle of view represented by the centre region 903 with a first spatial gain value 953 audio filter, the region to the left of the angle of view represented by a left region $905_L$ with an associated spatial audio filter gain value $951_L$ and the region to the right of the angle of view represented by a right remainder region $905_R$ with a spatial audio filter gain value 951R.

In the example shown in FIG. 10a the left and right remainder regions are separated from the angle of view region by a left transition region $957_L$ with a gain profile $955_L$ and the angle of view and right region by a right transition region $955_R$ with a gain profile $955_R$. In the example shown in FIG. 10a the spatial audio filter profile is configured to focus on the centre region within the angle of view with a lower audio gain value for the sources outside of the angle of view.

With respect to FIG. 10b a similar example is shown by a graphical arrangement showing an off centre audio spatial filter gain profile with a centre region 967, a right region 968 (with a transition region 969), a left region 961 (with a left transition region 967) and a far left region 963 (with a far left transition region between the far left and left regions 955).

Although the above has been described with regards to audio signals, or audio-visual signals it would be appreciated that embodiments may also be applied to audio-video signals where the audio signal components of the recorded data are processed according to embodiments of the application.

It shall be appreciated that the term user equipment is intended to cover any suitable type of wireless user equipment, such as mobile telephones, portable data processing devices or portable web browsers.

Furthermore elements of a public land mobile network (PLMN) may also comprise apparatus as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one camera, at least one processor and at least one non-transitory memory including computer code for one or more programs, the at least one memory and the computer code configured to with the at least one processor cause the apparatus to:
determine a viewing angle associated with the at least one camera;
determine from at least two audio signals a direction of at least one audio source;
define a first direction range associated with the viewing angle so as to control a level of the at least one audio source dependent on whether the at least one audio source direction is located within the first direction range;
display a representation of the first direction range, wherein the representation of the first direction range comprises an indication of at least one of:
a gain value for at least the first direction range, or
a gain value for outside the first direction range; and
receive a user input that comprises an indication of a change in said gain value for outside the first direction range to control the level of the at least one audio source, wherein the controlling of the level of the at least one audio source is dependent on whether the at least one audio source is within the first direction range or outside the first direction range.

2. The apparatus as claimed in claim 1, wherein the determined at least one audio source direction comprises a direction of the at least one audio source relative to the apparatus.

3. The apparatus as claimed in claim 1, wherein the at least one memory and the computer code configured to with the at least one processor further cause the apparatus to generate at least one spatial filter defining said first direction range.

4. The apparatus as claimed in claim 3, wherein the at least one memory and the computer code configured to with the at least one processor further cause the apparatus to:
generate an audio signal associated with the at least one audio source from the at least two audio signals; and
spatially filter the audio signal associated with the at least one audio source using the at least one spatial filter.

5. The apparatus as claimed in claim 3, wherein generating the at least one spatial filter is arranged to generate the at least one spatial filter dependent on the at least one audio source direction relative to the apparatus.

6. The apparatus as claimed in claim 3, wherein the at least one spatial filter comprises one of a pass filter or a stop filter for the first direction range.

7. The apparatus as claimed in claim 3, wherein the at least one spatial filter comprises one of a pass filter or a stop filter for outside the first direction range.

8. The apparatus as claimed in claim 3, wherein the at least one spatial filter comprises a unitary gain portion within said first direction range and a roll-off filtering portion outside said first direction range.

9. The apparatus as claimed in claim 3, wherein the at least one spatial filter comprises a unitary gain portion within said first direction range and a damping portion outside said first direction range.

10. The apparatus as claimed in claim 9, wherein the at least one spatial filter further comprises a transition portion between said unitary gain portion and said damping portion.

11. The apparatus as claimed in claim 3, wherein the at least one spatial filter comprises a unitary gain portion within said first direction range, a muting portion outside said first direction range, and a transition portion between said unitary gain portion and said muting portion.

12. The apparatus as claimed in claim 10, wherein the at least one memory and the computer code configured to with the at least one processor further cause the apparatus to receive user input for adjusting width of the transition portion.

13. The apparatus as claimed in claim 3, wherein generating the at least one spatial filter is arranged to generate the at least one spatial filter dependent on motion of the at least one audio source relative to the apparatus.

14. The apparatus as claimed in claim 2, wherein determining the viewing angle comprises at least one of:
determining a horizontal field of view of the at least one camera;
determining a vertical field of view of the at least one camera;
determining a focal length of the at least one camera;
determining a sensor size of the at least one camera;
determining an aspect ratio of the at least one camera;
determining a digital zoom of the at least one camera; or
determining a viewing angle from a user interface input.

15. A method for audio signal adjustment, the method comprising:
determining a viewing angle associated with at least one camera;
determining from at least two audio signals a direction of at least one audio source;
defining a first direction range associated with the viewing angle so as to control a level of the at least one audio source dependent on whether the at least one audio source direction is located within the first direction range;
displaying a representation of the first direction range, wherein the representation of the first direction range comprises an indication of at least one of:
a gain value for at least the first direction range, or
a gain value for outside the first direction range; and
receiving a user input that comprises an indication of a change in said gain value for outside the first direction range to control the level of the at least one audio source, wherein the controlling of the level of the at least one audio source is dependent on whether the at least one audio source is within the first direction range or outside the first direction range.

16. The method as claimed in claim 15, further comprising:
generating at least one spatial filter defining said first direction range.

17. The method as claimed in claim 16, further comprising:
generating an audio signal associated with the at least one audio source from the at least two audio signals; and
spatially filtering the audio signal associated with the at least one audio source using the at least one spatial filter.

18. The method as claimed in claim 16, wherein the at least one spatial filter comprises a unitary gain portion within said first direction range and a damping portion outside said first direction range.

19. The method as claimed in claim 18, wherein the at least one spatial filter further comprises a transition portion between said unitary gain portion and said damping portion.

20. The method as claimed in claim 16, wherein the at least one spatial filter comprises a unitary gain portion within said first direction range, a muting portion outside said first direction range, and a transition portion between said unitary gain portion and said muting portion.

\* \* \* \* \*